(12) United States Patent
Kim

(10) Patent No.: US 10,771,759 B2
(45) Date of Patent: Sep. 8, 2020

(54) METHOD AND APPARATUS FOR TRANSMITTING DATA IN NETWORK SYSTEM

(71) Applicant: Samsung Electronics Co., Ltd., Suwon-si, Gyeonggi-do (KR)

(72) Inventor: Dong-Yeon Kim, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/033,912

(22) Filed: Jul. 12, 2018

(65) Prior Publication Data

US 2019/0020862 A1    Jan. 17, 2019

(30) Foreign Application Priority Data

Jul. 13, 2017 (KR) .......................... 10-2017-0089265

(51) Int. Cl.
| | | |
|---|---|---|
| *H04N 13/117* | (2018.01) | |
| *H04N 13/194* | (2018.01) | |
| *H04N 5/232* | (2006.01) | |
| *G06F 3/01* | (2006.01) | |
| *G06F 3/0481* | (2013.01) | |

(52) U.S. Cl.
CPC .......... *H04N 13/117* (2018.05); *G06F 3/011* (2013.01); *G06F 3/04815* (2013.01); *H04N 5/23238* (2013.01); *H04N 13/194* (2018.05); *G06F 3/0481* (2013.01)

(58) Field of Classification Search
CPC .............. H04N 13/117; H04N 13/194; H04N 5/23238; G06F 3/011; G06F 3/04815; G06F 3/0481

See application file for complete search history.

(56) References Cited

U.S. PATENT DOCUMENTS

| | | |
|---|---|---|
| 2016/0217760 A1 | 7/2016 | Chu et al. |
| 2016/0277772 A1 | 9/2016 | Campbell et al. |
| 2016/0337630 A1 | 11/2016 | Raghoebardajal et al. |
| 2017/0161881 A1 | 6/2017 | Najaf-Zadeh et al. |
| 2017/0255372 A1* | 9/2017 | Hsu ........................ G06F 3/0485 |
| 2018/0061002 A1* | 3/2018 | Lee ........................ H04N 19/88 |
| 2018/0199042 A1* | 7/2018 | Wang ............... H04N 21/44008 |

FOREIGN PATENT DOCUMENTS

WO    2017/048370 A1    3/2017

OTHER PUBLICATIONS

Written Opinion of International Searching Authority and International Search Report dated Oct. 19, 2018, for counterpart International Application No. PCT/KR2018/007990.

* cited by examiner

*Primary Examiner* — John R Schnurr
(74) *Attorney, Agent, or Firm* — Jefferson IP Law, LLP

(57) ABSTRACT

A method for transmitting media data is provided. The method includes transmitting, to a display device, guide information on a scope of a content for displaying the content based on the scope, and transmitting, to the display device, at least one asset of the content corresponding to the scope. The guide information comprises guide type information which indicates a type for describing the scope.

14 Claims, 10 Drawing Sheets

| | | |
|---|---|---|
| Left region | Middle region | Right region |

| Physical condition information | Guide area |
|---|---|
| Left turn | Left |
| Right turn | Right |
| Quick turn | Middle |

FIG.9

When FOV boundary / viewport boundary corresponds to asset boundary
(may result under given circumstance between server and client)

Guided FOV

| Asset 1 | Asset 2 | Asset 3 | Asset 4 | Asset 5 | Asset 6 |
|---|---|---|---|---|---|
| Asset 7 | Viewport #1 Asset 8 | Asset 9 | Asset 10 | Asset 11 | Asset 12 |
| Asset 13 | Asset 14 | Asset 15 | Asset 16 | Viewport #2 Asset 17 | Asset 18 |
| Asset 19 | Asset 20 | Asset 21 | Asset 22 | Asset 23 | Asset 24 |

FIG.10

Since boundary is mainly dependent on client device,
type of the boundary is mostly free form Guided FOV

| Asset 1 | Asset 2 | Asset 3 | Asset 4 | Asset 5 | Asset 6 |
|---|---|---|---|---|---|
| Asset 7 | Asset 8 Viewport #1 | Asset 9 | Asset 10 | Asset 11 | Asset 12 |
| Asset 13 | Asset 14 | Asset 15 | Asset 16 | Viewport #2 Asset 17 | Asset 18 |
| Asset 19 | Asset 20 | Asset 21 | Asset 22 | Asset 23 | Asset 24 |

FIG.11

When range of asset is not consistent

Guided FOV

| Asset 1 | Asset 2 | Asset 3 | Asset 4 | | Asset 5 |
|---|---|---|---|---|---|
| Asset 6 | Viewport #1 Asset 7 | Asset 8 | | | Asset 9 |
| Asset 10 | | | Asset 12 | Viewport #2 Asset 13 | |
| Asset 14 | Asset 11 | | Asset 15 | | |

FIG.12

A region on the spherical surface specified by
four great circles

A region on the spherical surface specified by
two yaw circles and two pitch circles

METHOD AND APPARATUS FOR TRANSMITTING DATA IN NETWORK SYSTEM

CROSS-REFERENCE TO RELATED APPLICATION(S)

This application is based on and claims priority under 35 U.S.C. § 119(a) of a Korean patent application number 10-2017-0089265, filed on Jul. 13, 2017, in the Korean Intellectual Property Office, the disclosure of which is incorporated by reference herein in its entirety.

BACKGROUND

1. Field

The disclosure relates to methods and apparatuses for transmitting and receiving composite multimedia data including various types of multimedia data and multimedia services in multimedia systems. More particularly, the disclosure relates to apparatuses and methods for transmitting immersive multimedia data over a composite network including a broadcast network, a communication network, and other networks, e.g., transmitting composite multimedia data by way of moving picture experts group (MPEG) media transport (MMT*) and omnidirectional media format (OMAF*).

MMT: ISO/IEC 23008-1 standards
OMAF: ISO/IEC 23090-2 standards

2. Description of Related Art

Immersive multimedia refers to multimedia including 360-degree images, panoramic images, and omnidirectional media, which are images captured in various directions. Immersive multimedia may be obtained by use of one or more camera lenses at the same time, with the lenses left in fixed positions or while rotating the lenses.

FIG. 1 is a view illustrating an example of an immersive multimedia capturing device.

Immersive multimedia may be provided via a head mount display (HMD) worn on the user's head.

FIG. 2 is a view illustrating an example of an HMD.

In streaming out immersive multimedia from a transmitter to a receiver and displaying the immersive multimedia, the displaying of the immersive multimedia may be limited to a range viewable by the user depending on the user's current viewing direction.

When physical conditions of the capturing device change, immersive multimedia may be sharply shaken or turned and may be subject to drastic brightness variations. In this case, the user wearing the immersive multimedia player, e.g., an HMD, may feel dizzy or have a bad emotional feeling. In a scenario where a 360-degree camera is installed on the front of a car for video recording, the user's dizziness may worsen, e.g., when driving over bumps, making a quick left turn, suddenly speeding up or down, or passing through a tunnel.

Depending on the user's viewing direction, only a portion of immersive multimedia may be displayed, and the user may be free to move within the overall range of the immersive multimedia. Such freedom of viewing direction may cause the user to miss scenes in the immersive multimedia content, which may be critical in following up the immersive multimedia content. For example, in the case of an immersive-multimedia horror movie, if a ghost comes up from the left-hand part of the scene, and the user is viewing the right-hand part at the moment, then the user may miss the ghost. Such situation would not be what the producer has originally intended, i.e., failing to properly deliver his artistic intent.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide methods and apparatuses for varying the range viewable to the user depending on changes in the physical conditions of an immersive multimedia capturing device when providing an immersive multimedia streaming service in a data transmission system.

Additional aspects will be set forth in part in the description which follows and, in part, will be apparent from the description, or may be learned by practice of the presented embodiments.

In accordance with an aspect of the disclosure, a method for transmitting data is provided. The method includes transmitting, to a display device, guide information on a scope of a content for displaying the content based on the scope, and transmitting, to the display device, at least one asset of the content corresponding to the scope. The guide information comprises guide type information which indicates a type for describing the scope.

In accordance with an aspect of the disclosure, a method for receiving data is provided. The method includes receiving, to a display device, guide information on a scope of a content for displaying the content based on the scope, and receiving, to the display device, at least one asset of the content corresponding to the scope. The guide information comprises guide type information which indicates a type for describing the scope.

The method includes receiving guide information on a scope on a content for displaying by a receiver, and receiving at least one asset of the content. The guide information comprises guide type information which indicates a type of an element to describe the scope, and the at least one asset corresponds to the scope.

In accordance with an aspect of the disclosure, a method for transmitting data is provided. The method includes storing pieces of information necessary for transmitting and consuming a moving picture experts group (MPEG) media transport (MMT) package (MP) in tables based on a role of each piece of information among the pieces of information, transmitting the tables from an MMT transmit end to a receive end through an MMT signaling message, storing a list of all assets constituting the MP in an MP table, and transmitting the MP table containing the list of all of the assets through a package access (PA) message. The MP includes time-related information about all of the assets constituting the MP, a position of data, and relevant descriptors necessary to consume the assets.

The range viewable to the user may be varied depending on changes in the physical conditions of an immersive multimedia capturing device when providing an immersive multimedia streaming service in a data transmission system.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in connection with the accompanying drawings, in which:

FIG. 9 is a view illustrating an example of guide area mapping information as per physical condition information according to an embodiment of the disclosure;

FIGS. 10, 11, 12, 13, and 14 are views illustrating a relationship between field of view (FOV), viewport, and viewpoint according to various embodiments of the disclosure;

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although the terms "first" and "second" are used to describe various components, the components are not limited by the terms. These terms are provided simply to distinguish one component from another. Accordingly, the first component mentioned herein may also be the second component within the technical spirit of the disclosure.

The following components may be included according to the disclosure.

(A) Moving picture experts group (MPEG) media transport (MMT) data model.

In an MMT system, a set of logical media data is referred to as a package. The MMT package (MP) includes one or more assets corresponding to the media data set, presentation information for specifying the spatial relationship between the assets, and asset delivery characteristics containing quality-of-service (QoS) or transmission-related information necessary for transmitting the assets.

Figure 1:
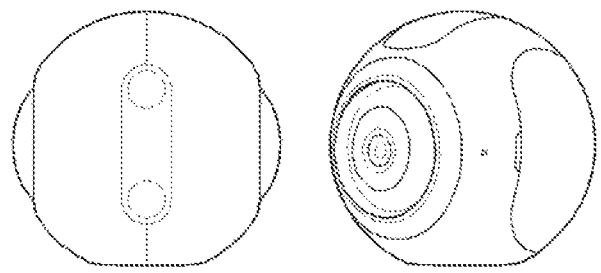
FIG. 1 is a view illustrating an example of an immersive multimedia capturing device.
Figure 2:
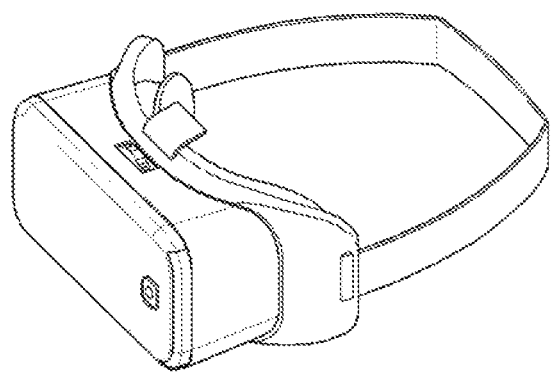
FIG. 2 is a view illustrating an example of a head mount display (HMD)
Figure 3:
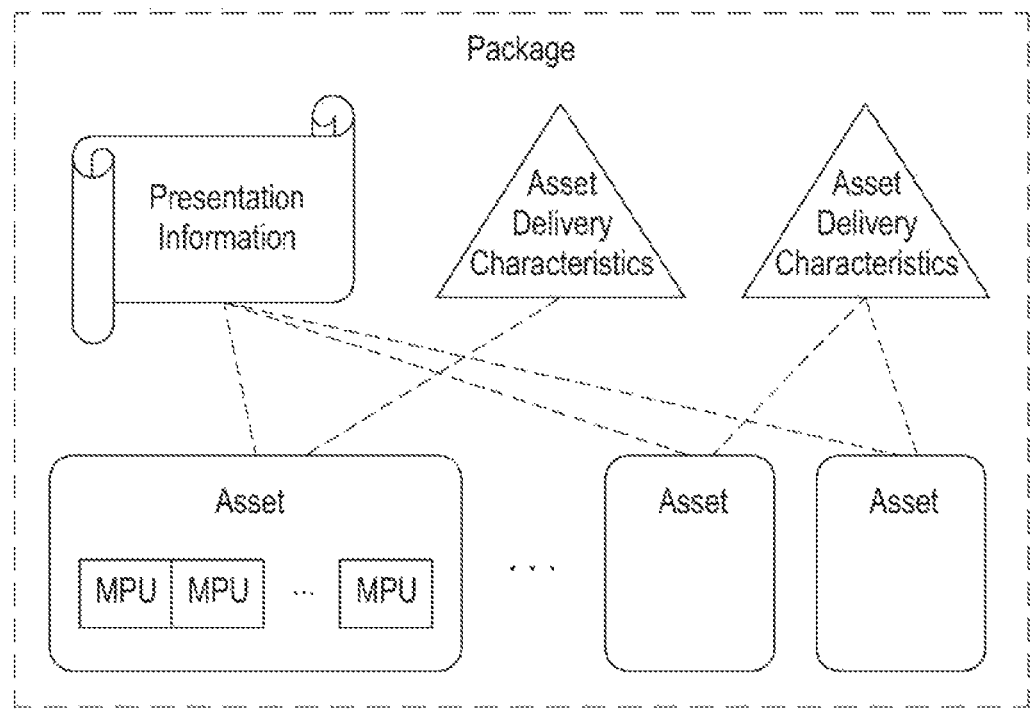
FIG. 3 is a view schematically illustrating an example of a moving picture experts group (MPEG) media transport (MMT) package according to an embodiment of the disclosure.

FIG. 3 is a view schematically illustrating an example of an MP according to an embodiment of the disclosure.

Referring to FIG. 3, asset refers to a set of media data constituting one multimedia presentation, and one asset includes one or more media processing units (MPUs) with an asset identifier (ID). In one asset, each MPU includes asset pieces that do not overlap each other. In other words, two different MPUs do not have the same media sample.

The MPU corresponds to a unit of media data that may independently be consumed in the presentation engine of a MMT receiving entity (also referred to herein as a receiver). As used herein, the term "entity" may also be referred to as a device.

Processing one MPU in one MMT entity includes encapsulating/decapsulating and packetizing/de-packetizing media data in MPU units.

One MPU may be segmented in units of one or more MPU fragments. An example of an MPU fragment is a media fragment unit (MFU).

One MPU may be segmented in units of one or more data units for packetization purposes.

One MPU may be specified with the asset ID, which indicates where the MPU belongs, and one MPU sequence number. For example, two different MPUs belonging to one asset may have the same asset ID and different MPU sequence numbers.

Media data contained in the MPU include timed media data, which are time-related, and non-timed media data which are not time-related. In the case of containing timed media data, presentation information should also be provided to describe the relationship on the time axis between the different assets in one package. For all the MPUs, presentation time information is given as part of the presentation information.

Figure 4:
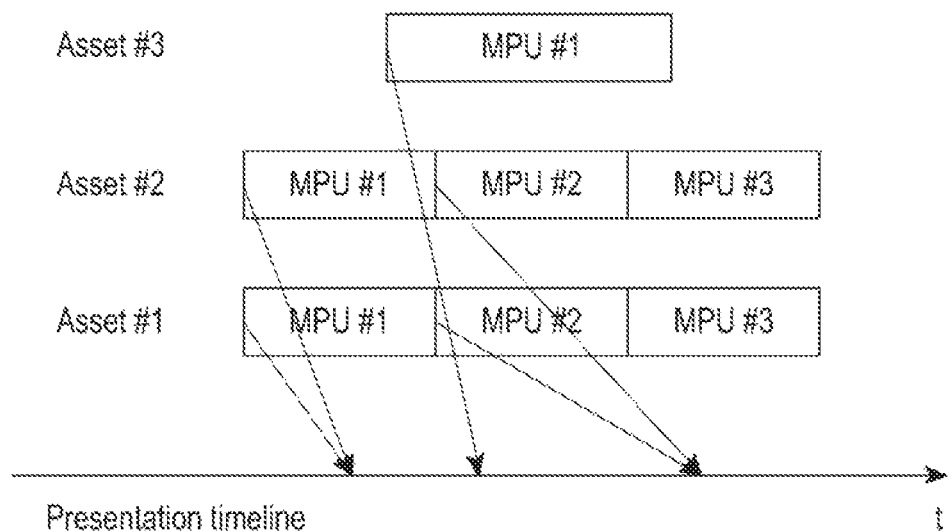
FIG. 4 is a view schematically illustrating a method for mapping a media processing unit (MPU) to a presentation time line according to an embodiment of the disclosure.

FIG. 4 is a view schematically illustrating a method for mapping an MPU to a presentation time line according to an embodiment of the disclosure.

(B) IOS base media file format-based MPU.

ISO base media file format (ISO BMFF) refers to the ISO/IEC 14496-12 standards.

Referring to FIG. 4, one MPU needs to be compatible with the ISO BMFF file. The MPU sequence number and asset ID of the MPU are provided in the 'mmpu' box, which may be elements to specify the MPU as a unique one among the MPUs encapsulated in the file. For timed media, one 'sidx' box may exist, which may serve as the indexes of the movie fragments constituting the MPU. The 'moov' box should retain all codec setting information to decode and present media data.

Timed media data are stored in the ISO BMFF track (one media track is allowed). Non-timed media are stored as part of the metadata of one ISO BMFF.

Figure 5A:
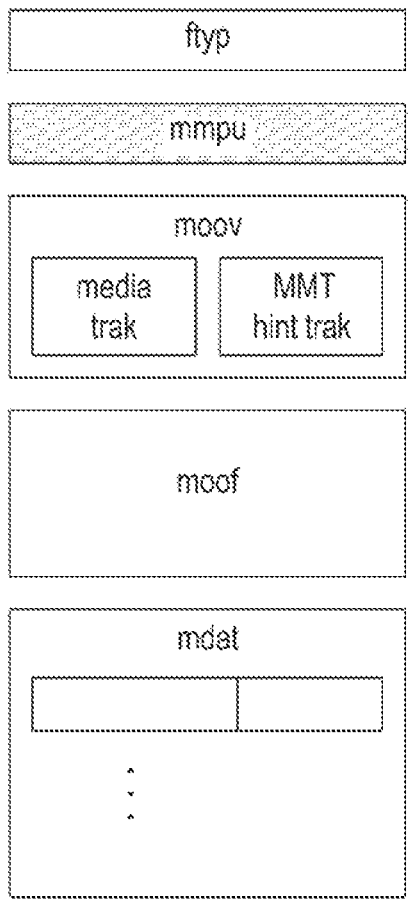
FIGS. 5A and 5B are views illustrating examples of two types of MMT encapsulation, according to various embodiments of the disclosure.
Figure 5B:
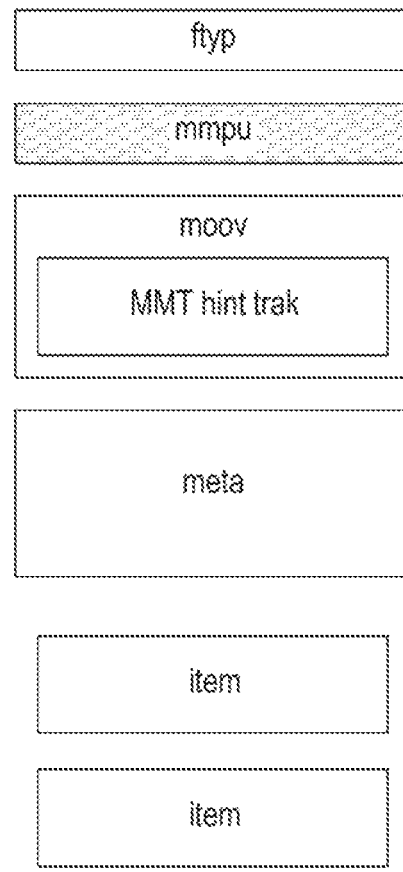

FIGS. 5A and 5B are views illustrating examples of two types of MMT encapsulation, according to various embodiments of the disclosure.

FIG. 5A relates to timed media, and FIG. 5B relates to non-timed media. For MPU packet transmission, there is provided information necessary to convert the MPU, which has one MMT hint track encapsulated therein, into MMTP payload and MMTP packets.

(C) Configuration of Multimedia Data.

Referring to FIGS. 5A and 5B, in providing the user with one multimedia content, the multimedia content may be constituted of video, audio, and subtitles data. For the subtitles data, a plurality of subtitles data may be provided in different languages. For example, media components of one multimedia content may include one video data item, one audio data item, and two subtitles data items, and the subtitles data items may include an English subtitles data item and a Korean subtitles data item.

Each media component may be stored in the form of a track as defined in ISO BMFF (ISO/IEC 14496-12), and this track may be defined as an asset in the MMT system.

Accordingly, the multimedia data, which are constituted of video, audio, English subtitles, and Korean subtitles in the above example, may be constituted of a video asset, an audio asset, an English subtitles asset, and a Korea subtitles asset in the MMT system, and each asset may be divided into one or more MPUs.

For the subtitles asset, representing a set of subtitles data items presented in one scene as one paragraph, data items corresponding to one paragraph may be stored in one MPU.

(D) Signaling Information.

In the MMT system, the transmit (TX) end and the receive (RX) end may exchange signaling information necessary for MP transmission and MP consumption.

The MMT signaling information may be transmitted in the form of an MMT signaling message, and a common format for MMT signaling messages may be defined as shown in Table 1. A syntax of the general format of the MMT signaling message is given in Table 1 below.

TABLE 1

| Syntax | Value | No. of bits | Mnemonic |
|---|---|---|---|
| signalling_message ( ) { | | | |
|    message_id | | 16 | uimsbf |
|    version | | 8 | uimsbf |
|    if(message_id != PA_message && message_id != MPI_message) { | | | |
|      length | | | |
| | | 16 | uimsbf |
|    } else { | | | |
|      length | | | |
| | | 32 | uimsbf |
|    } | | | |
|    extension | | | |
|    message_payload { | | | |
|      } | | | |
| } | | | |

Semantics of Table 1 are given in Table 2 below.

TABLE 2

[Semantics]

message_id - this field indicates the identifier of the signalling message.
version - this field indicates the version of the signalling message. Both MMT sending entity and
    MMT receiving entity can verify whether a received message has a new version of not.
length - this field indicates the length of the signalling message. This field for all signalling
    message except PA messages and MPI message is 2 bytes long. The length of PA messages
    and MPI messages is 4 bytes long because it is expected that occasionally an MPI table whose
    length cannot be expressed by a 2 bytes length fields. Also note that a PA message includes
    at least one MPI table.
extension - this field provides extension information for signalling messages that require
    extension. The content and length of this field are specified for these signalling messages.
message_payload - the payload of the signalling message. The format of this field can be
    identified by the value of the message_id field.

(E) MP Table.

Pieces of information necessary for transmitting and consuming MPs may be stored in tables depending on their roles, and necessary tables may be transmitted from the MMT TX end to the RX end through MMT signaling messages.

A list of all the assets constituting one MP may be stored in the MP table and transmitted through the PA message. The MP table includes time-related information about all the assets constituting the MP, position of data, and relevant descriptors necessary to consume the assets. A complete MP table has the information related to a Package including the list of all Assets. A subset MP table has a portion of information from a complete MP table. In addition, MP table subset-0 has the minimum information required for Package consumption.

The MP table may be defined as shown in Tables 3 to 6. A syntax of the MP table is defined in Table 3 and Table 4.

Semantics for the MP table are disclosed in Tables 5 and Table 6. An example of a descriptor related to the asset characteristics is the MPU timestamp descriptor.

TABLE 3

| Syntax | Value | No. of bits | Mnemonic |
|---|---|---|---|
| MP_table( ) { | | | |
|    table_id | | 8 | uimsbf |
|    version | | 8 | uimsbf |
|    length | | 16 | uimsbf |
|    reserved | '11 1111' | 6 | bslbf |
|    MP_table_mode | | 2 | bslbf |
|      if ((table_id == 0x10) or (table_id == 0x11)) | | | |
|       {MMT_package_id { | N1 | | |
|          MMT_package_id_length | | 8 | uimsbf |
|            for (i=0; i<N1; i++) { | | | |
|               MMT_package_id_byte | | 8 | uimsbf |
|            } | | | |
|         } | | | |
|       } | | | |
|      MP_table_descriptors { | N2 | | |
|         MP_table_descriptors_length | | 16 | uimsbf |
|         for (i=0; i<N2; i++) { | | | |
|            MP_table_descriptors_byte | | 8 | uimsbf |
|         } | | | |
|      } | | | |
|    } | | | |
|    number_of_assets | N3 | 8 | uimsbf |
|    for (i=0; i<N3; i++) { | | | |
|      Identifier_mapping( ) | | | |
|      asset_type | | 32 | char |
|      reserved | '1111 11' | 6 | bslbf |
|      default_asset_flag | | 1 | bslbf |
|      asset_clock_relation_flag | | 1 | bslbf |
|      if (asset_clock_relation_flag == 1) { | | | |
|         asset_clock_relation_id | | 8 | uimsbf |
|         reserved | '1111 111' | 7 | bslbf |
|         asset_timescale_flag | | 1 | bslbf |
|         if (asset_time_scale_flag == 1) { | | | |
|            asset_timescale | | 32 | uimsbf |

TABLE 4

| | Value | No. of bits | Mnemonic |
|---|---|---|---|
|         } | | | |
|      } | | | |
|      asset_location { | | | |
|         location_count | N4 | 8 | uimsbf |
|         for (i=0; i<N4; i++) { | | | |
|            MMT_general_location_info( ) | | | |
|         } | | | |
|      } | N5 | 16 | uimsbf |
|      asset_descriptors { | | | |
|         asset_descriptors_length | | 8 | uimsbf |
|         for (j=0; j<N5; j++) { | | | |
|            asset_descriptors_byte | | | |
|         } | | | |
|      } | | | |
|    } | | | |
| } | | | |

TABLE 5

[Semantics]

table_id - indicates the identifier of the MP table. A complete MP table and each subset MP
   tables shall use different table identifiers. Subset number of MP table is implicitly represented
   by this field. Since the table_id values are assigned contiguously, the MP table subset
   number can be deduced from this field, i.e., the MP table subset number equals this field minus
   the table_id of the base MP table. The MP table subset number provides the subset number
   of this MP table. The number '0' indicates base MP table and the numbers '1'~'14' indicate

TABLE 5-continued

[Semantics]

subset of MP table. The number '15' has a special meaning since it indicates a complete MP table.

version - indicates the version of the MP table. The newer version overrides the older one as soon as it is been received. If table_id indicates a complete MP table, if Subset-0 MP table has the same version value as this field (when MP_table_mode is '1'), or if all MP table subsets with lower-subset number have the same version value as this field (when MP_table_mode is '0'), or if processing of the MP table subsets are independent (when MP_table_mode is '2'). If Subset-0 MP table has a newer version, all MP table subsets with higher subset number up to 14 previously stored within an MMT receiving entity are treated as outdated except for the case when MP_table_mode is independent mode. When the MP table subset number is not 0 and MP_table_mode is '1', the contents of the MP table subset with version different from that of subset-0 MP table stored in an MMT receiving entity shall be ignored. Also when the MP table subset number is not 0 and MP_table_mode is '0', the contents of the MP table subset with version different from that of lower-subset MP table subsets stored in an MMT receiving entity shall be ignored. It shall be modulo-256 incremented per version change.

length - contains the length of the MP talbe in bytes, counting from the beginning of next field to the last byte of the MP table. The value '0' is not valid for this field.

MP_table_mode - It indicates the mode of an MP table subset processing when MP table subset mechanism is used. In "sequential_order_processing_mode" and with a non-zero subset number of this MP table, an MMT receiving entity shall receive all MP table subsets with lower subset number that have the same version as this MP table subset before it processes this MP table subset. For example, an MMT receiving entity can't process subset-3 MP table, if it has not received subset-2 MP table with the same version. In "order_irrelevant_processing_mode" and with the subset number of this MP table subset set to non-zero, an MMT receiving entity should process an MP table subset right after it receives the MP table subset as long as the subset-0 MP table stored in an MMT receiving entity has the same version as this MP table subset. In "independent_processing_mode", the version of each MP table subset is managed individually. Fragmented MP table where each MP table subset is delivered by one of multiple MMT sending entities is adapted in this mode. The independent mode of subsets of MP table can be used for the multi-channel instantiation, i.e. MP table subsets from subset-0 MP table to subset-N MP table are assigned as logical channels from Ch-0 to Ch-N. When an MPI message carries both an MPI table subset and the associated MP table subset, the PI_mode in the MPI table and the MP_table_mode in the MP table shall have the same value.

value of MP_table_mode

| Value | Description |
|---|---|
| 00 | "sequential_order_processing_mode" |
| 01 | "order_irrelevant_processing_mode" |
| 10 | "independent_processing_mode" |
| 11 | Reserved |

TABLE 6

MMT_package_id - this field is a unique identifier of the Package.

MMT_package_id_length - the length in bytes of the MMT_package_id string, excluding the terminating null character.

MMT_package_id_byte - a byte in the MMT_package_id. When the MMT_package_id_byte is string, the terminating null character is not included in the string.

asset_id - provides Asset identifier as defined in B.

asset_type - provides the type of Asset. This is described in four character code ("4CC") type registered in MP4REG (http://www.mp4ra.org).

MP_table_descriptors - this field provides descriptors for the MP table.

MP_table_descriptors_length - contains the length of the descriptor syntax loop. The length is counted from the next field to the end of the descriptor syntax loop. Several descriptors can be inserted in this syntax loop. For example, additional_package_information_URL descriptor can be included here, which provides the URL of Package information web page for this Package.

MP_table_descriptors_byte - one byte in the descriptors loop.

number_of_assets - provides the number of Assets whose information is provided by this MP table.

packet_id - provides the identifier of the MMTP session in the MMTP packet header.

asset_clock_relation_flag - indicates whether an Asset uses NTP clock or other clock system as the clock reference. If this flag is '1', asset_clock_relation_id field is included. If this field is '0', the NTP clock is used for the Asset.

asset_clock_relation_id - provides a clock relation identifier for the Asset. This field is used to reference the clock relation delivered by a CRI_descriptor ( ) for the Asset. The value of this field is one of the clock_relation_id values provided by the CRI descriptors.

TABLE 6-continued asset_timescale_flag - indicates whether "asset_timescale" information is provided or
    not. If this flag is '1', asset_timescale field is included and if this flag is set to '0',
    asset_timescale is 90,000 (90kHz).
location_count - provides the number of location information for an Asset. Set to '1' when an
    Asset is delivered through one location. When bulk delivery is achieved, in which MPUs
    contained in an Asset are delivered through multi-channels, not '1' is set. When one Asset is
    delivered over multiple locations, an MMT receiving entity SHALL receive all MPUs of the
    Asset from all indicated locations.
asset_timescale - provides information of time unit for all timestamps used for the Asset
    expressed in the number of units in one second.
MMT_general_location_info_for_asset_location - provides the location information
    of Asset. General location reference information for Asset defined in 9.6.1 is used. Only the
    value of location_type between '0x00' and '0x06' shall be used for an Asset
    location.
asset_descriptors_length - the number of bytes counted from the beginning of the next
    field to the end of the Asset descriptors syntax loop.
asset_descriptors_byte - a byte in Asset descriptors.
default_asset_flag - indicates whether an Asset is marked as a default asset or not. In case, an
    asset is marked as a default asset, the MPU timestamp descriptor should be present for the
    corresponding timed asset. If this flag is '0', the asset is marked as a default asset.

An asset_id syntax element group is used to provide Asset identifier. If 'mmpu' box present, the values of this syntax element group shall be identical to the Asset identifier of that box. If not present, the assignment of Asset identification is out of scope of this specification. A syntax of asset_id is defined in Table 7. Semantics for Table 7 are disclosed in Tables 8.

TABLE 7

| Syntax | Value | No. of bits | Mnemonic |
| --- | --- | --- | --- |
| asset_id( ) { | | | |
|   asset_id_scheme | | 32 | uimsbf |
|   asset_id_length | N | 8 | uimsbf |
|   for (j=0; j<N; j++) { | | | |
|     asset_id_byte | | 8 | uimsbf |
|   } | | | |
| } | | | |

TABLE 8 asset_id_scheme - provides the Asset ID scheme as defined in 6.3.3.
asset_id_length - provides the length in bytes of the asset_id.
asset_id_byte - a byte in the asset_id.

Identifier_mapping( ) syntax group element provides a mapping of the content identifier and an MMTP packet sub-flow. The MMTP packet sub-flow is the subset of the packets of an MMTP packet flow that share the same packet_id. The content identifier may be provided in different forms, such as asset identifier, a URL, or a pattern. The syntax of the Identifier_mapping( ) is provided in Table 9 below. Semantics for Table 9 are disclosed in Tables 10.

TABLE 9

| Syntax | Value | No. of bits | Mnemonic |
| --- | --- | --- | --- |
| Identifier_mapping ( ) { | | | |
|   identifier_type | | 8 | uimsbf |
|   if ( identifier type == 0x00) { | | | |
|     asset_id( ) | | | |
|   } else if (identifier_type == 0x01) { | | | |
|     URL_count | N1 | 16 | uimsbf |
|     for(i=0;i<N1;i++) { | | | |
|       URL_length[i] | | | |
|       for(j=0;j<N2;j++){ | N2 | 16 | uimsbf |
|         URL_byte[i] | | | |
|       } | | | |
|     } | | 8 | uimsbf |
|   } else if (identifier_type == 0x02) { | | | |
|     regex_length | | | |
|     for(i=0;i<N3;i++){ | | | |
|       regex_byte | N3 | 16 | uimsbf |
|     } | | | |
|   } else if (identifier_type == 0x03) { | | 8 | uimsbf |
|     representation_id_length | | | |
|     for (i=0;i<N4;++) { | | | |
|       representation_id_byte | | | |
|     } | N4 | 16 | uimsbf |
|   } else { | | | |

TABLE 9-continued

| Syntax | Value | No. of bits | Mnemonic |
|---|---|---|---|
|           private_length<br>          for(i=0;i<N5;i++){<br>              private_byte<br>          } | | 8 | uimsbf |
|     }<br>} | N5 | 16 | uimsbf |
| | | 8 | uimsbf |

TABLE 10

[Semantics]

identifier_type - provides the type of the identifier that is used for the mapping to the packet_id. The list of available identifier types is provided by the table below.

Identifier Types for the Identifier Mapping

| Value | Description |
|---|---|
| 0x00 | The identifier of the content is provided as an Asset id as defined in section 9.6.2. |
| 0x01 | The identifier of the content is provided as a list of URLs that are related together and share the same packet_id mapping. An example are DASH segments of the same representation. |
| 0x02 | The identifier of the content is provided as RegEx string that is used to match one or more URLs that identify files with the same packet_id mapping. |
| 0x03 | The identifier of the content is provided as a DASH Representation@id as defined in 23009-1 to identify all DASH segments of the same representation. |
| 0x04~0xFF | This value range is reserved for private identifiers. |

URL_count - the URL is a list of URLs and this value indicates the number of URLs provided in this list.
URL_length - the length in bytes of the following URL.
URL_byte - a byte of the URL that is formatted as an UTF-8 character string
regex_length - the identifier is provided as a regular expression that matches a set of URLs and this field indicates the length of the RegEx string.
regex_byte - a byte of the RegEx string that is provided as a UTF-8 string.
representation_id_length - the identifier is provided as a DASH Representation@id and this value indicates the length of the Representation@id string.
representation_id_byte - a byte of the Representation@id string.
private_length - the identifier is provided as private data and this field provides the length of the private identifier in bytes.
private_byte - a byte of the private identifier.

(F) MPU Timestamp Descriptor.

As set forth above, for each asset, presentation time information may be transmitted per MPU, and this may be contained in the MP table describing the per-asset characteristics. In the MMT system, the start time of presentation of each MPU may be described in the MPU timestamp descriptor and may be added to the MP table, allowing the MPUs of the assets to sync with each other on the presentation time axis. This descriptor provides presentation time of the first AU of MPU in presentation order after application of any offset such as the one provided by 'elst' box. When presentation information presents this descriptor shall be ignored. Syntax of MPU timestamp descriptor is defined as shown in Table 11. Semantics for Table 11 are disclosed in Tables 12.

TABLE 11

| Syntax | Value | No. of bits | Mnemonic |
|---|---|---|---|
| MPU_timestamp_descriptor ( ) {<br>    descriptor_tag<br>    descriptor_length | N * 12 | 16<br>8 | uimsbf<br>uimsbf |
|     for (i=0; i<N; i++) {<br>        mpu_sequence_number<br>        mpu_presentation_time<br>    }<br>} | | 32<br>64 | uimsbf<br>uimsbf |

TABLE 12 descriptor_tag - a tag value indicating the type of a descriptor.
descriptor_length - indicates the length in bytes counting from the next byte after this field to the last byte of the descriptor.
mpu_sequence_number - indicates the sequence number of the MPU presented at a time given the following mpu_presentation_time.
mpu_presentation_time - indicates the presentation time of the first AU in the designated MPU by 64 bit NTP time stamp format.

Table 13 is a table describing the meanings of relevant terms as used herein.

TABLE 13

| | |
|---|---|
| Omnidirectional media format | This part of ISO/IEC 23090 specifies the omnidirectional media format for coding, storage, delivery, and rendering of omnidirectional images and video and the associated audio. Omnidirectional video may contain graphics elements generated by computer graphics. At the receiver side, it is assumed that the user sits in the center of the sphere and looks towards outside. |
| omnidirectional media | image or video and its associated audio that enable rendering according to the user's viewing orientation, if consumed with a head-mounted device, or according to user's desired viewport, otherwise, as if the user was in the spot where and when the video and audio were captured |
| field of view | the extent of the observable world in captured/recorded content or in a physical display device (e.g., a Head Mounted Display), which can be either horizontal (Horizontal Field of View) or vertical (Vertical Field of View). |
| viewport | part of the spherical video that is currently displayed and viewed by the user |

NOTE:
The size of the viewport can be smaller than or equal to the field of view.

(G) Omnidirectional Media Format.

The omnidirectional media format-related section of ISO/IEC 23090 embodies the omnidirectional media format for coding, storing, delivering, and rendering omnidirectional images and videos and relevant audios.

The omnidirectional video may include graphic elements created by computer graphics. It is assumed on the RX side that the user sits in the center of the sphere while viewing the outside.

(H) Omnidirectional Media.

This means images or videos containing audios renderable depending on the user's viewing direction.

(I) Field of View (FOV).

This means the size of a range in which content is viewable via one physical display (e.g., a head mount display (HMD)).

(J) Viewport.

This means part of a spherical video that is currently being displayed or viewed by the user.

(K) Omnidirectional Media Metadata.

The omnidirectional media format (OMAF) standards define methods for specifying one region and a reference orientation for spherical media as set forth in Tables 14, 15, 16, 17 and 18.

TABLE 14

Timed metadata for regions on sphere

Introduction
This clause specifies a generic timed metadata track syntax for indicating regions on a sphere. The purpose for the timed metadata track is indicated by the sample entry type. The sample format of all metadata tracks specified in this clause starts with a common part and may be followed by an extension part that is specific to the sample entry of the metadata track. Each sample specifies a region on a sphere.
When a sphere region timed metadata track is linked to one or more media tracks with a 'cdsc' track reference, it describes each media track individually. When a sphere region timed metadata track is linked to several media tracks with a 'cdtg' track reference, each of the media tracks shall have a sample entry type equal to 'resv' and scheme_type equal to 'podv' in the SchemeTypeBox included in the sample entry.

NOTE:
The syntax allows for one sample to specify multiple regions on a sphere. However, there is a semantic restriction that limits the samples to have only one region.

TABLE 15

Sample entry
Definition
Exactly one RegionOnSphereConfigBox shall be present in the sample entry.
RegionOnSphereConfigBox specifies the shape of the region specified by the samples. When the horizontal and vertical ranges of the region in the samples do not change, they can be indicated in the sample entry.
Syntax
class RegionOnSphereSampleEntry(type) extends MetaDataSampleEntry(type) {
    RegionOnSphereConfigBox( ); // mandatory
    Box[ ] other_boxes; // optional
}
class RegionOnSphereConfigBox extends FullBox('rosc', version = 0, flags) {
    unsigned int(8) shape_type;
    bit(7) reserved = 0;
    unsigned int(1) dynamic_range_flag;
    if (dynamic_range_flag == 0) {
        unsigned int(32) static_hor_range;
        unsigned int(32) static_ver_range;
    }
    unsigned int(8) num_regions;
}

TABLE 15-continued

Figure 16:
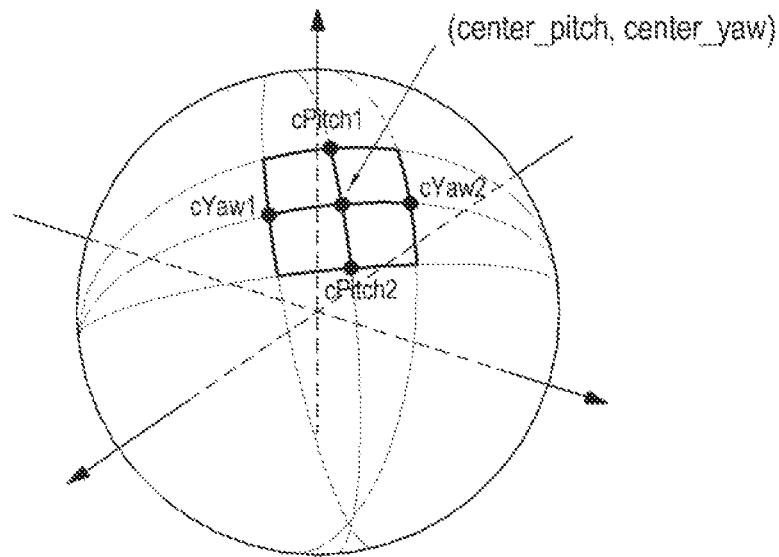
FIGS. 16 and 17 are views illustrating a region on omni-directional, spherical surface media, according to various embodiments of the disclosure.
Figure 17:
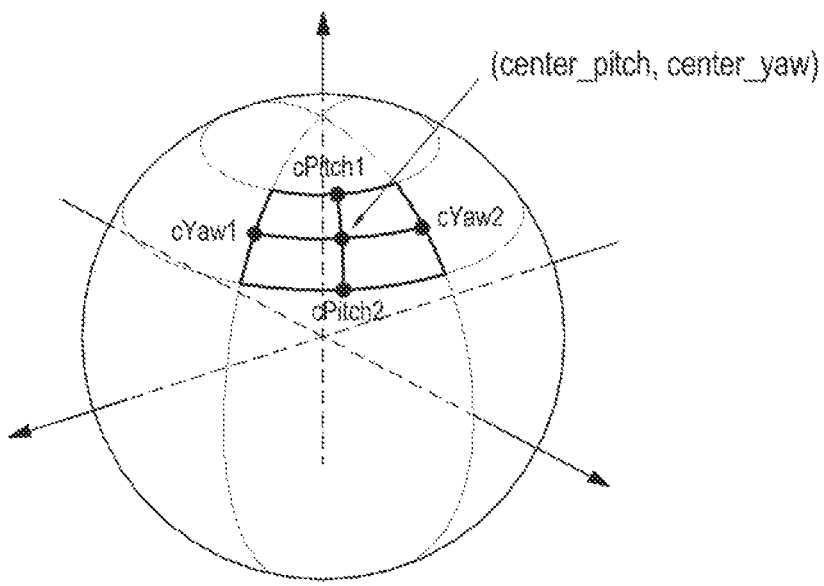

Semantics
- shape_type equal to 0 specifies that the region is specified by four great circles as illustrated in FIG. 16.
- shape_type equal to 1 specifies that the region is specified by two yaw circles and two pitch circles as illustrated in FIG. 17.
- shape_type values greater than 1 are reserved.
- dynamic_range_flag equal to 0 specifies that the horizontal and vertical ranges of the region remain unchanged in all samples referring to this sample entry. dynamic_range_flag equal to 1 specifies that the horizonal and vertical ranges of the region is indicated in the sample format.
- static_hor_range and static_ver_range specify the horizontal and vertical ranges, respectively, of the region for each sample referring to this sample entry in units of $2^{-16}$ degrees. static_hor_range and static_ver_rnge specify the ranges through the center point of the region, as illustrated by FIG. 16 or FIG. 17. static_hor_range shall be in the range of 0 to 720 * $2^{16}$, inclusive. static_ver_range shall be in the range of 0 to 180 * $2^{16}$, inclusive. When both static_hor_range and static_ver_range are equal to 0, the region for each sample referring to this sample entry is a point on a spherical surface.
- num_regions specifies the number of regions in the samples referring to this sample entry. num_regions shall be equal to 1. Other values of num_regions are reseved.

TABLE 16

Sample format
Definition
Each sample specifies a region on a sphere. The RegionOnSphereSample structure may be extended in derived track formats.
Syntax
aligned(8) RegionOnSphereStruct(range_included_flag) {
    signed int(32) center_yaw;
    signed int(32) center_pitch;
    singed int(32) center_roll;
    if (range_included_flag) {
      unsigned int(32) hor_range;
      unsigned int(32) ver_range;
    }
    unsigned int(1) interpolate;
    bit(7) reserved = 0;
}
aligned(8) RegionOnSphereSample( ) {
    for (i = 0; i < num regions; i++)
      RegionOnSphereStruct(dynamic_range_flag)
}
Semantics
  When RegionOnSphereStruct( ) is included in the RegionOnSphereSample( ) structure, the following applies:
  center_yaw, center_pitch, and center_roll specify the viewport orientation in units of $2^{-16}$ degrees relative to the global coordinate axes. center_yaw and center_pitch indicate the center of the viewport, and center_roll indicates the roll angle of the viewport. center_yaw shall be in the range of $-180 * 2^{16}$ to $180 * 2^{16} - 1$, inclusive. center_pitch shall be in the range of $-90 * 2^{16}$ to $90 * 2^{16}$, inclusive. center_roll shall be in the range of $-180 * 2^{16}$ to $180 * 2^{16} - 1$, inclusive.
  hor_range and ver_range, when present, specify the horizontal and vertical ranges, respectively, of the region specified by this sample in units of $2^{-16}$ degrees. hor_range and ver_range specify the range through the center point of the region, as illustrated by FIG. 16 or FIG. 17. hor_range shall be in the range of 0 to $720 * 2^{16}$, inclusive. ver_range shall be in the range of 0 to $180 * 2^{16}$, inclusive.
  The region specified by this sample is derived as follows:
- If both hor_range and ver_range are equal to 0, the region specified by this sample is a point on a spherical surface.
- Otherwise, the region on sphere is defined using variables cYaw1, cYaw2, cPitch1, and cPitch2 derived as follows:
  cYaw1 = (center_yaw − (range_included_flag ? hor_range : static_hor_range) ÷ 2) ÷65536
  cYaw2 = (center_yaw + (range_included_flag ? hor_range : static_hor_range) ÷ 2) ÷65536
  cPitch1 = (center_pitch − (range_included_flag ? ver_range : static_ver_range) ÷ 2) ÷65536
  cPitch2 = (center_pitch + (range_included_flag ? ver_range : static_ver_range) ÷ 2) ÷65536
  The region on sphere is defined as follows:

TABLE 17

- When shape_type is equal to 0 region is specified by four great circles defined by four points cYaw1, cYaw2, cPitch1, cPitch2 and the center point defined by center_pitch and center_yaw and as shown in FIG. 16.

TABLE 17-continued

- When shape_type is equal to 1 the region is specified by two yaw circles and two pitch circles defined by four points cYaw1, cYaw2, cPitch1, cPitch2 and the center point defined by center_pitch and center_yaw and as shown in FIG. 17.

Let the target media samples be the media samples in the referenced media tracks with composition times greater than or equal to the composition time of this sample and less than the composition time of the next sample.

interpolate equal to 0 specifies that the values of center_yaw, center_pitch, center_roll, hor_range (if present), and ver_range (if present) in this sample apply to the target media samples. interpolate equal to 1 specifies that the values of center_yaw, center_pitch, center_roll, hor_range (if present), and ver_range (if present) that apply to the target media samples are linearly interpolated from the values of the corresponding fields in this sample and the previous sample.

The value of interpolate for a sync sample, the first sample of the track, and the first sample of a track fragment shall be equal to 0.

TABLE 18

Initial viewpoint
Definition
The initial viewpoint region-on-sphere metadata indicates initial viewport orientations that should be used when playing the associated media tracks. In the absence of this type of metadata the playback should be started using the orientation (0, 0, 0) in (yaw, pitch, roll) relative to the global coordinate axes.
The sample entry type 'invp' shall be used.
shape_type shall be equal to 0, dynamic_range_flag shall be equal to 0, static_hor_range shall be equal to 0, and static_ver_range shall be equal to 0 in the RegionOnSphereConfigBox of the sample entry.
Sample syntax
class InitialViewpointSample( ) extends RegionOnSphereSample {
    unsigned int(1) refresh_flag;
    bit(7) reserved = 0;
}
Sample semantics
    NOTE 1:  As the sample structure extends from RegionOnSphereSample, the syntax elements of RegionOnSphereSample are included in the sample.
    center_yaw, center_pitch, and center_roll specify the viewport orientation in units of $2^{-16}$ degrees relative to the global coordinate axes. center_yaw and center_pitch indicate the center of the viewport, and center_roll indicates the roll angle of the viewport.
    interpolate shall be equal to 0.
    refresh_flag equal to 0 specifies that the indicated viewport orientation should be used when starting the playback from a time-parallel sample in an associated media track. refresh_flag equal to 1 specifies that the indicated viewport orientation should always be used when rendering the time-parallel sample of each associated media track, i.e. both in continuous playback and when starting the playback from the time-parallel sample.
    NOTE 2:  refresh_flag equal to 1 enables the content author to indicate that a particular viewport orientation is recommended even when playing the video continuously. For example, refresh_flag equal to 1 can be indicated for a scene cut position.

(L) Transmission of Immersive Multimedia.

The region simultaneously presentable by a user device when immersive multimedia is streamed to and played by the user device may be equal or smaller than the entire size of the 360-degree multimedia data. The size of the region in which the user device may present at the same time may be determined depending on the display size of the user device and other mechanical capabilities.

Figure 6:
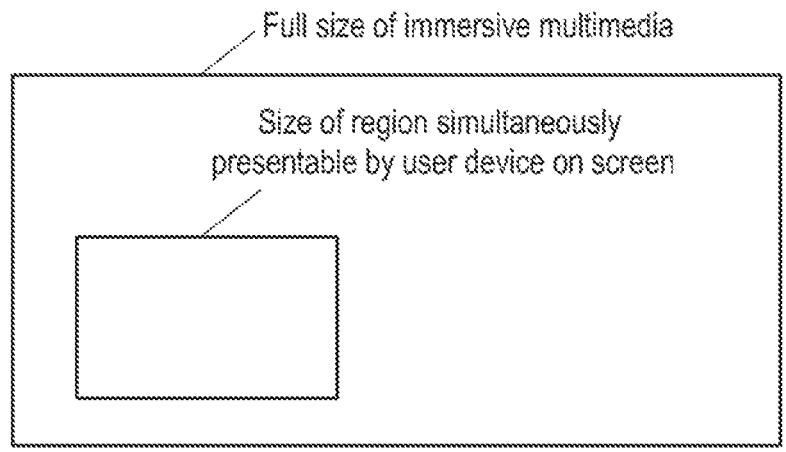
FIG. 6 is a view illustrating an example of a size of a screen of a user device and a size of immersive multimedia according to an embodiment of the disclosure.

FIG. 6 is a view illustrating an example of the size of a screen of a user device and the size of immersive multimedia according to an embodiment of the disclosure.

Referring to FIG. 6, the user device, which is the receiver of immersive multimedia streaming, may notify the transmitter for streaming of the user's current view point and viewing direction, and the transmitter may transmit the whole or part of the immersive multimedia data based on the information received from the receiver. When the transmitter transmits part of the immersive multimedia data, the receiver may display the data as it is. When the transmitter transmits the whole of the immersive multimedia data, the receiver only displays the region, which the user device may simultaneously present in the user's current view point and viewing direction, i.e., viewport. To specify the region to be presented fitting the user's view point and viewing direction of the entire immersive multimedia, the transmitter may send out metadata containing, e.g., coordinates in the multimedia and the horizontal and vertical sizes of the region along with the immersive multimedia.

Figure 7:
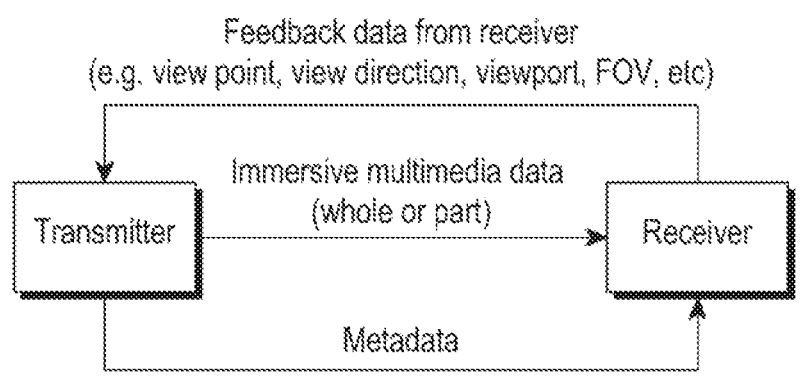
FIG. 7 is a view illustrating an example of a transmitter and a receiver for immersive multimedia streaming according to an embodiment of the disclosure.

FIG. 7 is a view illustrating an example of a transmitter and a receiver for immersive multimedia streaming according to an embodiment of the disclosure.

Referring to FIG. 7, for immersive multimedia streaming, it is possible to transmit immersive multimedia data from the transmitter to the receiver as described above, and what is possible also is that the media processing device stitches raw images captured by the capturing device into a single image, delivers the stitched image to the transmitter, and then to the receiver. As an example, a video recorded by a dual-lens 360-degree camera may be streamed in real-time to the user's HMD.

Figure 8:
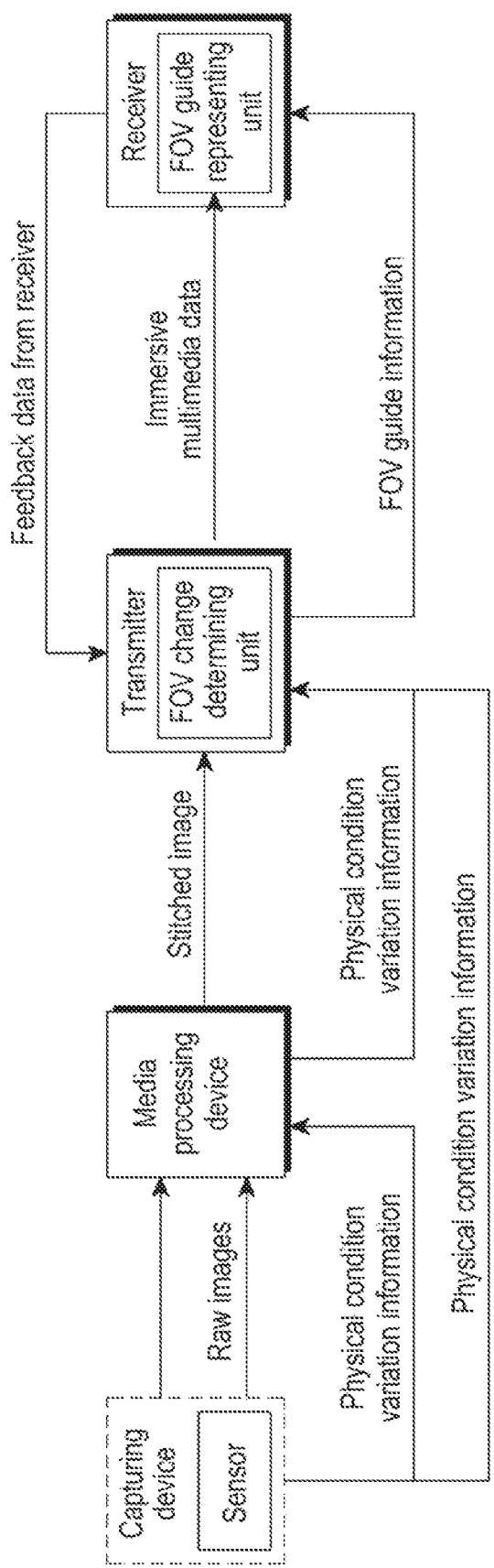
FIG. 8 is a view illustrating an example of a transmitter and a receiver for real-time streaming immersive multimedia according to an embodiment of the disclosure.

FIG. 8 is a view illustrating an example of a transmitter and a receiver for real-time streaming immersive multimedia according to an embodiment of the disclosure. The components are described with reference to FIG. 8.

A. Capturing Device.

Referring to FIG. 8, the capturing device captures as many raw images as the number of lenses of the capturing device. The sensor unit of the capturing device may obtain physical condition variation information about the capturing device. Examples of the physical condition variation information about the capturing device may include variations in the rotating direction and rotating speed of the 360-degree camera. As an example, when the 360-degree camera is installed in an automobile, if it makes a left turn, the rotating direction may be left, and the variation in the rotating speed may be a variation in the rotating speed of the camera due to the turning of the automobile.

B. Media Processing Device.

One or more raw images obtained by the capturing device are transmitted to the media processing device. The media processing device includes an image stitching module. The image stitching module stitches one or more raw images into a single image. An example of media processing is stitching two raw images captured by a dual-lens 360-degree camera into a single larger image. The stitched image may be encoded or stored in a file format as defined in the OMAF standards.

The stitched image is transmitted from the media processing device to the transmitter. Further, the physical condition variation information about the capturing device as described above may be delivered from the capturing device to the transmitter directly or via the media processing device.

C. Transmitter.

The transmitter may determine to change the FOV using the received stitched image and the physical condition information about the capturing device. The FOV change determining unit determines a guide area for guiding the user to be able to view the entire region that may be presented by the stitched image. In this case, the guide area is determined according to the physical condition variation information, and at this time, a determination function or mapping information is needed. An example of the determination function or mapping information may split the entire region into three portions to be mapped to the left region when the physical condition of the capturing device is a left turn, to the right region when the physical condition is a right turn, and to the central region when quickly making a left or right turn at a predetermined speed or more.

FIG. 9 is a view illustrating an example of guide area mapping information as per physical condition information according to an embodiment of the disclosure.

Referring to FIG. 9, the result of determining the guide area is generated as FOV guide information and transmitted from the transmitter to the receiver. An example of a method for transmitting the FOV guide information is transmitting the information from the MMT transmitter to the MMT receiver via the MMT system. In this case, the FOV guide information may be represented as an FOV guide descriptor.

The FOV guide information is transmitted together with the immersive multimedia data from the transmitter to the receiver. The transmitter may transmit the media data corresponding to the entire region that the immersive multimedia data may present or only media data corresponding to the region that the FOV guide information describes. Alternatively, the media data may be transmitted according to feedback data about, e.g., the user's viewing direction transmitted from the receiver.

D. FOV Guide Descriptor.

The FOV guide descriptor contains information necessary to allow the receiver to present the immersive multimedia data on the user display only for the data within the FOV region guided by the transmitter. When the receiver receives the data for the entire region of the immersive multimedia, only the region described by the FOV guide descriptor may be presented. When the receiver sends a request for the data of the region to be presented on the user device based on information, such as the user's view point, viewing direction, and the FOV of the user device to the transmitter, the request may be limited to only a portion, which falls within the region described by the FOV guide descriptor, of the region presented on the user display. When the user's view point or viewing direction fails to fully fall within the region described by the FOV guide descriptor, the receiver may guide the user to move the user device using a user interface (UI), such as subtitles or an arrow, in the user display.

The FOV guide descriptor may be transmitted through a piece of MMT signaling information in the MMT system. An example format of the FOV guide descriptor is as shown in Table 19.

TABLE 19

| Syntax | Value | No. of bits | Mnemonic |
|---|---|---|---|
| FOV_Guide_descriptor ( ) { | | | |
|    mandatory_flag( ) | | | |
|    guide_type | | | |
|    viewpoint( ) | | | |
|    viewport( ) | | | |
|    fieldofview( ) | | | |
|    guide_start | | | |
|    guide_duration | | | |
| } | | | |

Semantics of Table 19 are given below.

mandatory_flag: describes whether to force the user display for the region described by the descriptor. When the mandatory_flag is 1, the receiver may render only the media within the region described by the descriptor to the user display. When the mandatory_flag is 0, the receiver may also render media outside the region described by the descriptor to the user display.

guide_type: refers to the type of a method for describing the guide area. The describing method includes view point, view port, and field of view. The receiver may render the region including the view point, viewport, and field of view indicated by guide_type.

viewpoint: information about viewpoint to be guided. The format of the information follows the described initial viewpoint.

viewport: information about viewport to be guided. The format of the information follows the described RegionOnSphereSample.

fieldofview: information about FOV to be guided. The format of the information follows the described RegionOnSphereSample.

guide_start: refers to the start point where the guide applies as per the descriptor. This may be indicated with such information as UTC time, mpu sequence number, etc.

guide_duration: refers to a time during which the guide applies from the start point indicated by guide_start as per the descriptor.

E. Receiver.

The receiver presents immersive multimedia data to the user display according to the received FOV guide information. When the receiver receives the data for the entire region of the immersive multimedia, only the region described by the FOV guide descriptor may be presented. When the receiver sends a request for the data of the region to be presented on the user device based on information, such as the user's view point, viewing direction, and the FOV of the user device to the transmitter, the request may be limited to only a portion, which falls within the region described by the FOV guide descriptor, of the region presented on the user display. When the user's view point or viewing direction fails to fully fall within the region described by the FOV guide descriptor, the receiver may guide the user to move the user device using a UI, such as subtitles or an arrow, in the user display.

As methods for representing the guide area, the rest except for the guide area may be darkened or blurred. When the user viewing in the guide area escapes off the guide area, such a UI may be presented as if it bounces off to the inside of the guide area.

F. Relationship Between Guide Information and Asset in MMT System.

One immersive multimedia data item may be constituted of one or more assets depending on the configuration of the MMT system. The visual regions of the media data represented by the assets may be the same or different.

FIGS. 10, 11, 12, 13, and 14 are views illustrating the relationship between FOV, viewport, and viewpoint according to various embodiments of the disclosure.

Referring to FIGS. 10, 11, 12, 13, and 14, when the type of the FOV information is FOV, if the current viewpoint of the receiver is within the FOV, all corresponding assets may be transmission-requested, received, or presented.

In the example shown in FIG. 11, when the user device's viewport is Viewport #2, Asset 11, Asset 17, and Asset 23 including the guide FOV may be transmission-requested, received, and presented, while Asset 12, Asset 18, and Asset 24 may not be presented.

Figure 13:
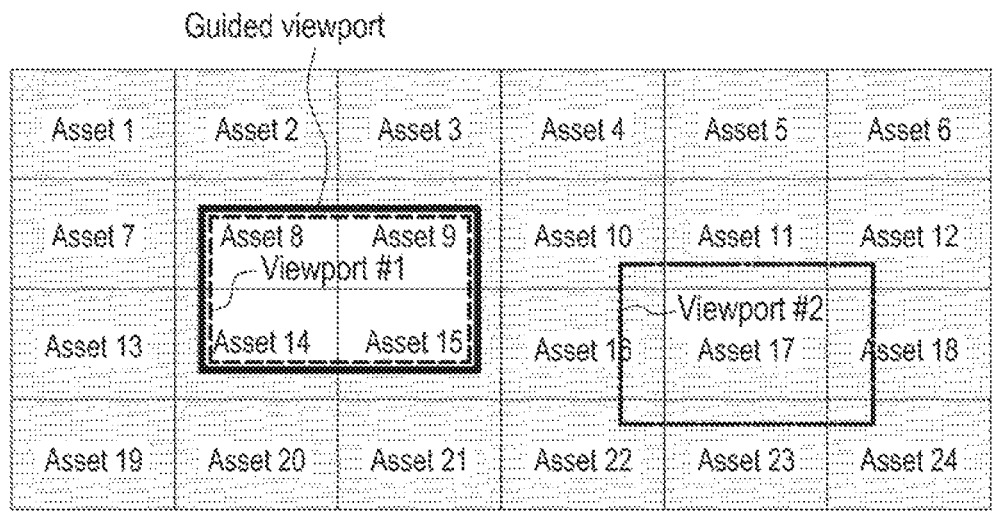

When the guide type is viewport, if the viewport of the user device matches the guide viewport as shown in FIG. 13, the corresponding assets, i.e., Assets, 8, 9, 14, and 15, may be presented.

When the viewport of the user device overlaps—rather than fully matches—the guide viewport, they may be presented in the same manner as is for the FOV type.

Figure 14:
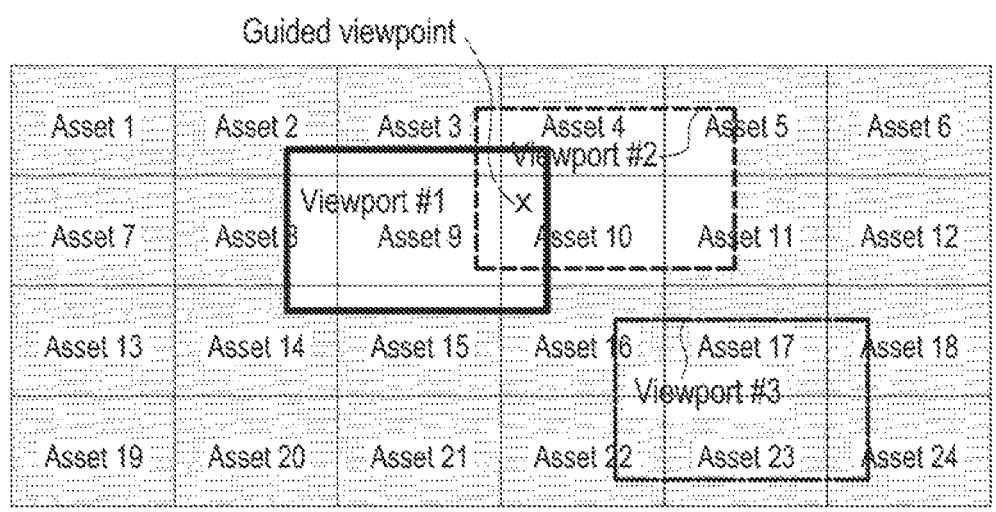

FIG. 14 illustrates the case where the guide type is viewport. When the viewport of the user device includes the guide viewpoint, the corresponding assets may be transmission-requested, received, and presented.

Figure 15:
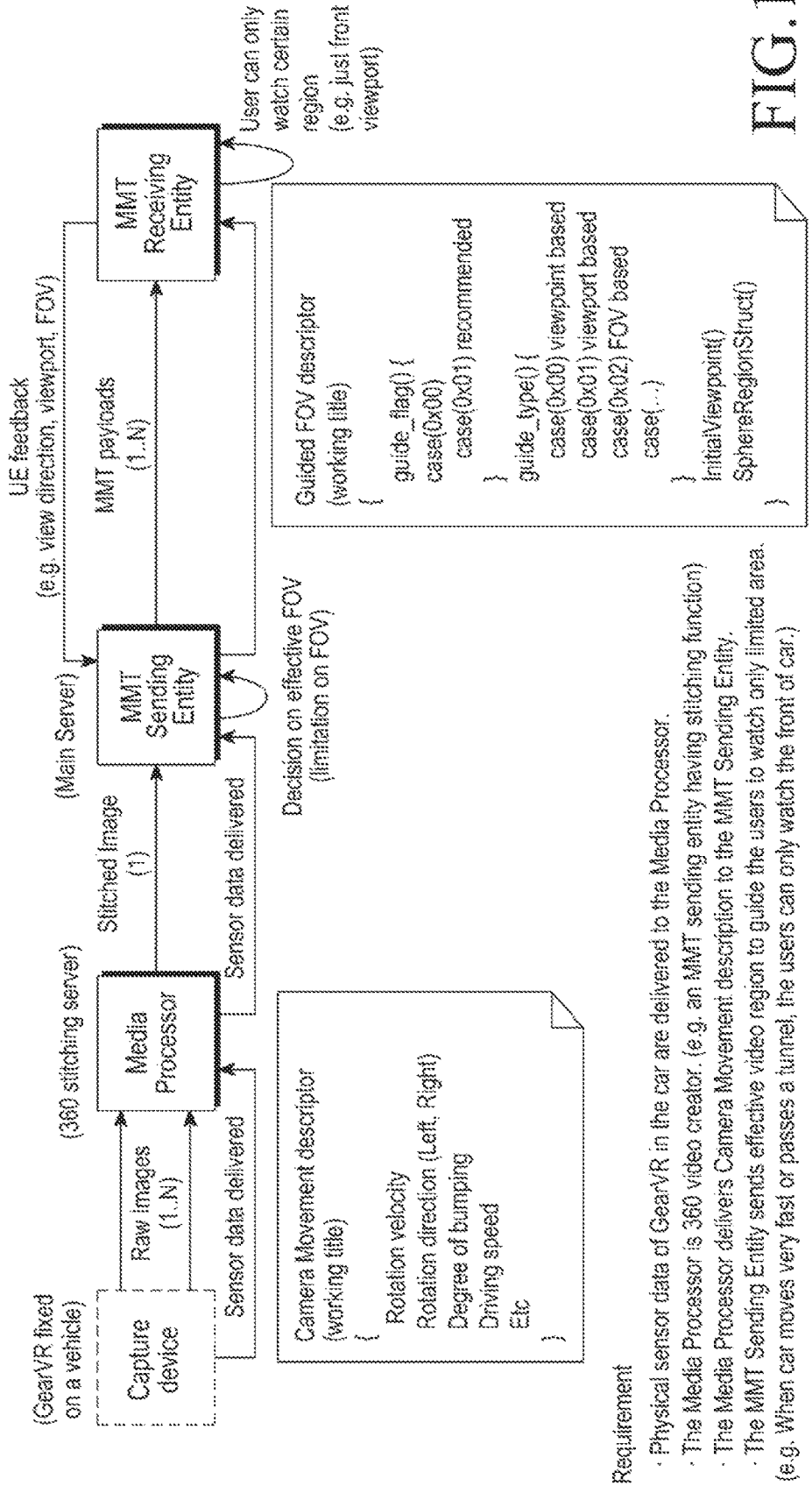
FIG. 15 is a view illustrating an example of a transmitter and a receiver for real-time streaming immersive multimedia according to an embodiment of the disclosure.

FIG. 15 is a view illustrating an example of components for real-time streaming immersive multimedia according to an embodiment of the disclosure.

FIGS. 16 and 17 are views illustrating a region on omni-directional, spherical surface media, according to various embodiments of the disclosure.

As is apparent from the foregoing description, according to embodiments of the disclosure, there may be provided methods and apparatuses for varying the range viewable to the user depending on changes in the physical conditions of an immersive multimedia capturing device when providing an immersive multimedia streaming service in a data transmission system.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for transmitting three-dimensional (3D) content, the method comprising:
    identifying, by a sending entity, a guide message including guide information on at least a portion of the 3D content to be displayed in a receiving entity; and
    transmitting, to the receiving entity, the guide message,
    wherein the guide information comprises flag information indicating whether to present only a guide region associated with the guide information in the receiving entity and type information on a type relating to the guide region.

2. The method of claim 1, wherein, in case that a viewport displayed by the receiving entity comprises a portion outside a scope represented by the guide information, a user interface for guiding a user to move is displayed by the receiving entity, or the portion outside the scope is darkened or blurred.

3. The method of claim 1, wherein the guide information is generated based on feedback data received from the receiving entity, and the guide information comprises information describing at least one of a viewport displayed by the receiving entity, a view point displayed by the receiving entity, and a field of view of the receiving entity.

4. The method of claim 1, wherein the guide message is transmitted using a Moving Picture Experts Group (MPEG) Media Transport (MMT) protocol.

5. The method of claim 1, wherein, in case that the flag information is set to a first value, only the guide region is presented in the receiving entity.

6. The method of claim 5, wherein, in case that the flag information is set to a second value, both the guide region and a rest of region associated with the 3D content is presentable in the receiving entity.

7. A method for receiving three-dimensional (3D) content, the method comprising:
    receiving, by a receiving entity from a sending entity, a guide message including guide information on at least a portion of the 3D content to be displayed in the receiving entity,
    wherein the guide information comprises flag information indicating whether to present only a guide region associated with the guide information in the receiving entity and type information on a type relating to the guide region.

8. The method of claim 7, wherein, in case that a viewport displayed by the receiving entity comprises a portion outside a scope represented by the guide information, a user interface for guiding a user to move is displayed by the receiving entity, or the portion outside the scope is darkened or blurred.

9. The method of claim 7, wherein the guide information is generated based on feedback data received from the receiving entity, and the guide information comprises information describing at least one of a viewport displayed by the receiving entity, a view point displayed by the receiving entity, and a field of view of the receiving entity.

10. The method of claim 7, wherein the guide message is received using a Moving Picture Experts Group (MPEG) Media Transport (MMT) protocol.

11. The method of claim 7, wherein, in case that the flag information is set to a first value, only the guide region is presented in the receiving entity.

12. The method of claim 11, wherein, in case that the flag information is set to a second value, both the guide region and a rest of region associated with the 3D content is presentable in the receiving entity.

13. A sending entity for transmitting three-dimensional (3D) content, the sending entity comprising:
a transceiver; and
at least one processor,
wherein the at least one processor is configured to:
identify a guide message including guide information on at least a portion of the 3D content to be displayed in a receiving entity, and
transmit, to the receiving entity, the guide message, and
wherein the guide information comprises flag information indicating whether to present only a guide region associated with the guide information in the receiving entity and type information on a type relating to the guide region.

14. A receiving entity for receiving three-dimensional (3D) content, the receiving entity comprising:
a transceiver; and
at least one processor,
wherein the at least one processor is configured to:
receive, from a sending entity, a guide message including guide information on at least a portion of the 3D content to be displayed in the receiving entity, and
wherein the guide information comprises flag information indicating whether to present only a guide region associated with the guide information in the receiving entity and type information on a type relating to the guide region.

* * * * *